S. BIPPUS.
Thill-Couplings.

No. 146,861.  Patented Jan. 27, 1874.

UNITED STATES PATENT OFFICE.

SAMUEL BIPPUS, OF DAYTON, OHIO.

IMPROVEMENT IN THILL-COUPLINGS.

Specification forming part of Letters Patent No. 146,861, dated January 27, 1874; application filed September 20, 1873.

*To all whom it may concern:*

Be it known that I, SAMUEL BIPPUS, of Dayton, in the county of Montgomery and State of Ohio, have invented certain new and useful Improvements in Buggy-Shackles; and I do hereby declare that the following is a full, clear, and exact description thereof, reference being had to the accompanying drawings and to the letters of reference marked thereon, which form a part of this specification.

This invention relates to shackles for attaching thills to a carriage; and consists in the construction of the parts and the combination of the same, as hereinafter more fully described.

In order to enable others to construct and use my invention, I will now proceed to describe it, referring to the accompanying drawing, in which—

Figure 1:
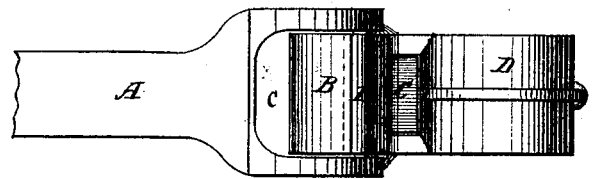
Figure 2:
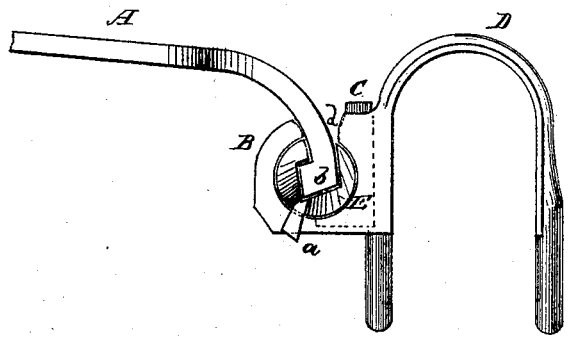
Figure 3:
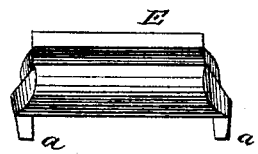

Figure 1 represents a plan view of a device embodying my invention. Fig. 2 represents a side elevation, and Fig. 3 represents a plan view of the socket.

A represents the part that is attached directly to the thill, the rear part being curved downward, and provided with a square or angular stem, $b$, and opening $c$. B represents the seat, which is formed as a part of the clip D. The seat B has a bearing for the socket E, with an opening, $d$, at the top, and a cavity or chamber for the reception of the rubber packing C, the chamber being of such form that the rubber is protected and held securely in place, the rubber forming a bearing for a portion of the socket E. The socket fits snugly in the bearing of the seat B, and through the center of the socket is formed a square or angular hole, made in form to correspond to the shape of the stem $b$ on the thill-iron A. The socket is also provided with a slot just wide enough to admit one side of the thill-iron when being attached and detached, and is further provided with two lugs, $a$ $a$, upon each side, to hold it in position in the seat. The clip D may be of any convenient form, so as to present a suitable means of attachment to the carriage.

To use my invention, the socket is turned so that the lugs come opposite to the opening in the top of the seat, and the socket will then slide in the bearing from one side. The socket is then turned in the bearing until the opening in the socket registers with the opening in the seat. The narrow portion of the stem $b$ on the thill-iron is then placed in the opening from the side, and it can then be placed in position, and when slightly turned in the socket, it is firmly locked in position, but free to turn either way. The rubber pressing the socket forward in the bearing renders the device noiseless. There will be no wear of the inside of the socket, as the stem $b$ fits snugly therein.

By this means, an improved shackle is formed convenient in use, simple in construction, and durable, without bolt or screw, and one which can be readily attached and detached at pleasure.

Having thus fully described my invention, what I claim, and desire to secure by Letters Patent, is—

1. The seat B, socket E, rubber C, shaft-iron A, with head $b$, all constructed and combined, substantially as and for the purpose set forth.

2. The socket E, with lug $a$, in combination with the seat B and thill-iron A, with head $b$, all constructed as described, and for the purpose specified.

In testimony that I claim the foregoing as my own, I affix my signature in presence of two witnesses.

SAMUEL BIPPUS.

Witnesses:
T. G. BARRON,
JAMES LINDEN.